US006778194B2

(12) United States Patent
Jones

(10) Patent No.: US 6,778,194 B2
(45) Date of Patent: Aug. 17, 2004

(54) METHOD, APPARATUS AND COMPUTER PROGRAM PRODUCT FOR ELIMINATING UNNECESSARY DIALOG BOX POP-UPS

(75) Inventor: Steven Paul Jones, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 09/973,158

(22) Filed: Oct. 9, 2001

(65) Prior Publication Data

US 2003/0067493 A1 Apr. 10, 2003

(51) Int. Cl.$^7$ ................................................. G06F 3/00
(52) U.S. Cl. ...................... 345/808; 345/809; 345/763; 345/749
(58) Field of Search ................................ 345/808, 749, 345/760, 762, 763, 765, 767, 742–743, 805, 806–807, 795, 797, 779, 748, 826, 825, 824, 780, 809, 440, 853–854, 818–820, 713; 712/5, 25; 713/500–503; 709/202–203; 710/104–107

(56) References Cited

U.S. PATENT DOCUMENTS

| | | | | | |
|---|---|---|---|---|---|
| 5,557,730 | A | * | 9/1996 | Frid-Nielsen | ................ 345/839 |
| 5,822,123 | A | * | 10/1998 | Davis et al. | .................... 725/43 |
| 5,963,964 | A | * | 10/1999 | Nielsen | .................... 715/501.1 |
| 6,012,086 | A | * | 1/2000 | Lowell | ......................... 709/218 |
| 6,029,175 | A | * | 2/2000 | Chow et al. | ............. 707/104.1 |
| 6,157,943 | A | * | 12/2000 | Meyer | ......................... 709/203 |
| 6,175,863 | B1 | * | 1/2001 | Belfiore et al. | ............. 709/218 |
| 6,282,702 | B1 | * | 8/2001 | Ungar | ......................... 717/148 |
| 6,345,318 | B1 | * | 2/2002 | Gamon | .......................... 710/8 |
| 6,384,853 | B1 | * | 5/2002 | Shaffer et al. | .............. 345/867 |
| 6,389,472 | B1 | * | 5/2002 | Hughes et al. | ............. 709/229 |
| 6,476,827 | B1 | * | 11/2002 | Porter | ......................... 345/738 |
| 6,484,149 | B1 | * | 11/2002 | Jammes et al. | ................ 705/26 |
| 6,542,163 | B2 | * | 4/2003 | Gorbet et al. | ................ 345/711 |
| 6,546,397 | B1 | * | 4/2003 | Rempell | ...................... 707/102 |
| 6,636,247 | B1 | * | 10/2003 | Hamzy et al. | .............. 345/808 |
| 6,665,659 | B1 | * | 12/2003 | Logan | ........................... 707/3 |
| 6,667,751 | B1 | * | 12/2003 | Wynn et al. | ................ 345/833 |
| 6,687,737 | B2 | * | 2/2004 | Landsman et al. | .......... 709/203 |
| 6,697,825 | B1 | * | 2/2004 | Underwood et al. | ........ 715/530 |

OTHER PUBLICATIONS

Microsoft Corp, The Windows Interface: An Applications Design Guide, chapter 6, Redmond, Washington, 1992.*
Randall, Jones, Special Edition Using Microsoft FrontPage 2002, chapters 15, 20, 25, USA, 2001.*
Bruce, SAMS Teach Yourself Macromedia Dreamweaver 3 In 24 Hours, chapter 12, SAMS Publishing, USA, 2000.*

* cited by examiner

*Primary Examiner*—Steven Sax
(74) *Attorney, Agent, or Firm*—Joan Pennington

(57) ABSTRACT

A method, apparatus and computer program product are provided for eliminating unnecessary dialog box pop-ups. When web page data are retrieved, checking for a pop-up command within the retrieved web page data is performed. Responsive to identifying the pop-up command within the retrieved web page data, checking a saved web page data pop-up command list for the identified pop-up command is performed. Responsive to identifying the pop-up command within the saved web page data pop-up command list, the pop-up command is ignored. Responsive to failing to identify the pop-up command within the saved web page data pop-up command list, the pop-up command is saved within the saved web page data pop-up command list. The access time for the pop-up command is saved together with the pop-up command within the saved web page data pop-up command list. When the pop-up command identified within the saved web page data pop-up command list is older than a predetermined time limit, then the access time for the pop-up command is reset in the saved web page data pop-up command list and the dialog box pop-up is displayed.

17 Claims, 4 Drawing Sheets

METHOD, APPARATUS AND COMPUTER PROGRAM PRODUCT FOR ELIMINATING UNNECESSARY DIALOG BOX POP-UPS

FIELD OF THE INVENTION

The present invention relates generally to the data processing field, and more particularly, relates to a method, apparatus and computer program product for eliminating unnecessary dialog box pop-ups.

DESCRIPTION OF THE RELATED ART

The Internet, an international, wide area network connects thousands of disparate packet-switching networks in industry, education, government, and research. The Internet provides a medium for effectively communicating with others and a research support and information retrieval mechanism. The Internet enables the exchange of information quickly and conveniently. However, when searching on topics of interest, a web page being reviewed often includes a window or pop-up indicating that a plugin is needed or advertising some idea, service, or product.

These dialog box pop-ups while informative prove particularly annoying when moving back and forth between the web page that initiated the dialog box pop-ups and another page. This happens frequently when using the back button in known browser windows, such as the Netscape browser windows, to get back to the first page and possibly go to other links.

A need exists for the ability for a browser program, such as Netscape, to detect what web page created the pop-up boxes and then disable or turn them off after the user has seen them once. A need exists for a method by which the browser program can be configured to accomplish this task.

SUMMARY OF THE INVENTION

A principal object of the present invention is to provide a method, apparatus and computer program product for eliminating unnecessary dialog box pop-ups. Other important objects of the present invention are to provide such a method, apparatus and computer program product for eliminating unnecessary dialog box pop-ups substantially without negative effect and that overcome many of the disadvantages of prior art arrangements.

In brief, a method, apparatus and computer program product are provided for eliminating unnecessary dialog box pop-ups. When web page data are retrieved, checking for a pop-up command within the retrieved web page data is performed. Responsive to identifying the pop-up command within the retrieved web page data, checking a saved web page data pop-up command list for the identified pop-up command is performed. Responsive to identifying the pop-up command within the saved web page data pop-up command list, the pop-up command is ignored.

In accordance with features of the invention, responsive to failing to identify the pop-up command within the saved web page data pop-up command list, the pop-up command is saved within the saved web page data pop-up command list. The access time for the pop-up command is saved together with the pop-up command within the saved web page data pop-up command list. When the pop-up command identified within the saved web page data pop-up command list is older than a predetermined time limit, then the access time for the pop-up command is reset in the saved web page data pop-up command list and the dialog box pop-up is displayed.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
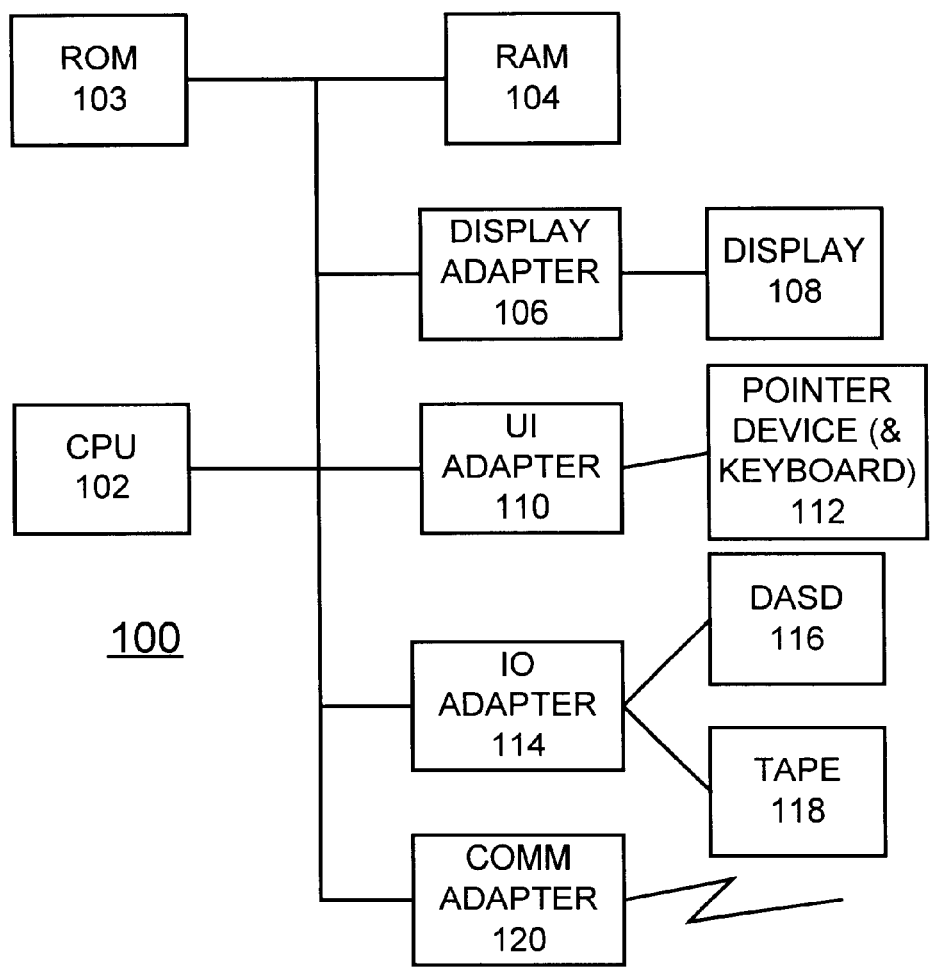
FIGS. 1A and 1B are block diagram representations illustrating a computer system and operating system for eliminating unnecessary dialog box pop-ups in accordance with the preferred embodiment.
Figure 1B:
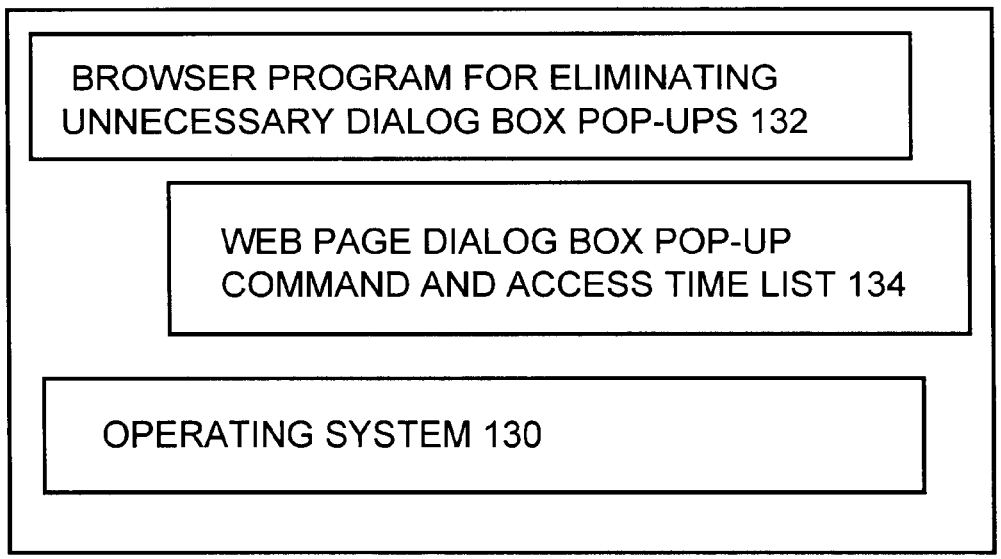

Having reference now to the drawings, in FIGS. 1A and 1B, there is shown a computer or data processing system generally designated by the reference character 100 for carrying out the unnecessary dialog box pop-ups elimination methods of the preferred embodiment. As shown in FIG. 1A, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130, a browser program for eliminating unnecessary dialog box pop-ups 132 of the preferred embodiment. It should be understood that unnecessary dialog box pop-ups elimination methods of the preferred embodiment can be provided as integral features of the browser program 132, or as a separate dialog box pop-ups elimination program used together with the browser program 132. A web page dialog box pop-up command and access time list 134 is stored and maintained in accordance with the preferred embodiment.

Various commercially available computers can be used for computer system 100; for example, an IBM personal computer. CPU 102 is suitably programmed by the browser program for eliminating unnecessary dialog box pop-ups 132 to execute the flowchart of FIG. 2 and to store and maintain the web page dialog box pop-up command and access time list 134.

In accordance with features of the preferred embodiment, when the browser program 132 reads a web page and is told to bring up dialog boxes or information boxes, dialog box pop-ups elimination browser program 132 logs the web page and ignores the command to pop up these same dialog boxes if this web page is loaded again within a predetermined period of time, for example, a 15 minute period or any other user selected amount of time. This way, if the user follows a link from this page and then returns to the page that was logged by the browser the user does not have to see the dialog boxes again or close them again, and the like. The dialog box pop-ups elimination browser program 132 also has an option to store pop-up box information in any event it was ever needed. The dialog box pop-ups elimination browser program 132 also is configured to eliminate unnecessary repetitive popup windows when one leaves a web site.

Figure 2:
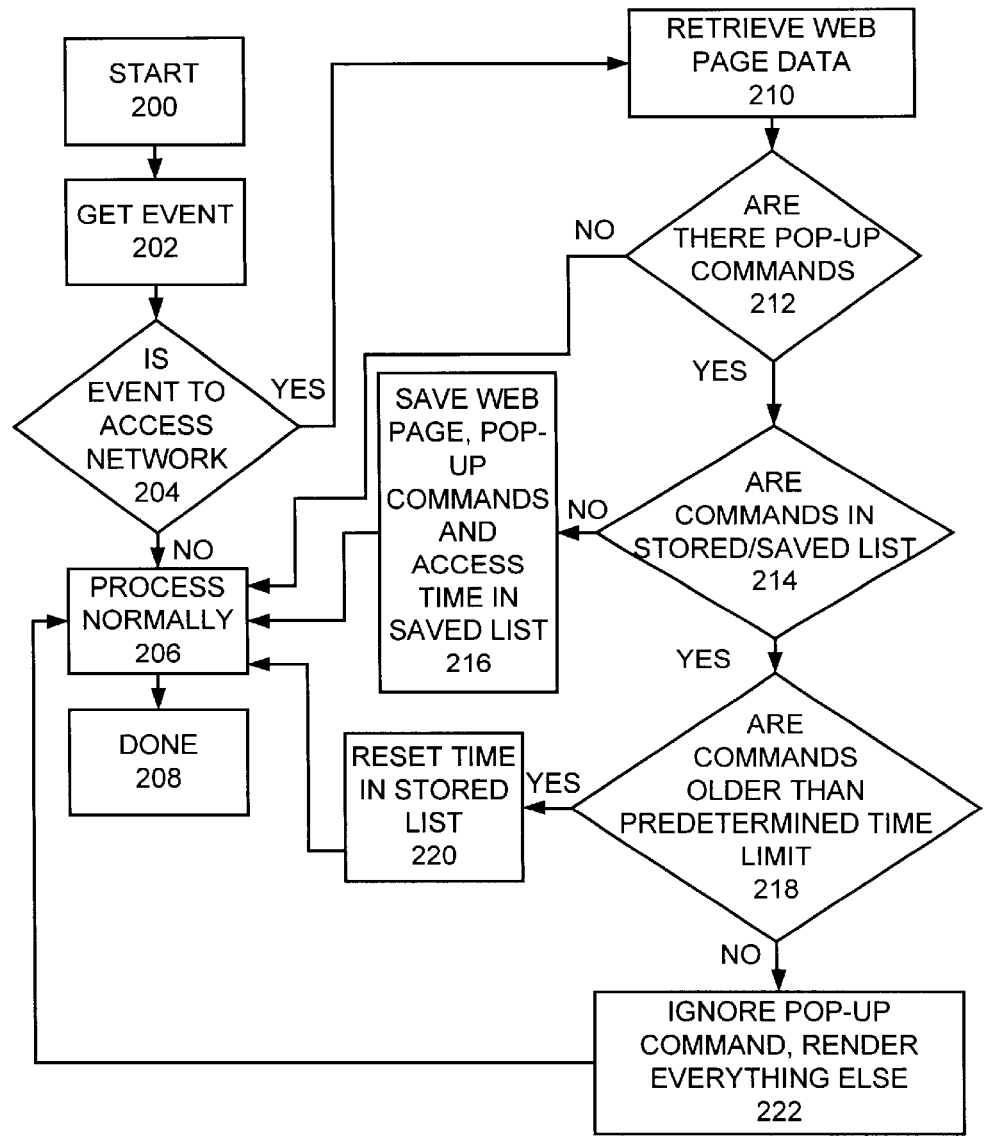
FIG. 2 is a flow chart illustrating exemplary steps for eliminating unnecessary dialog box pop-ups in accordance with the preferred embodiment.

Referring now to FIG. 2, there are shown exemplary steps for eliminating unnecessary dialog box pop-ups in accordance with the preferred embodiment starting at block 200. An event, such as a mouse click or accessing the network or opening a Universal Resource Locator (URL), is identified as indicated in a block 202. Checking whether the event is for accessing the network is performed as indicated in a decision block 204. When the event is not to access the network, then normal processing is performed as indicated in a block 206. Normal processing is completed as indicated in a block 208.

When the event is to access the network identified at decision block 204, then web page data are retrieved as indicated in a block 210. Checking for any pop-up commands in the retrieved web page data is performed as indicated in a decision block 212. When no pop-up commands in the retrieved web page data are found, then normal processing is performed at block 206.

When any pop-up commands in the retrieved web page data are found, then checking whether the pop-up commands are stored in the saved web page dialog box pop-up command and access time list 134 as indicated in a decision block 214. If the identified pop-up commands are not stored in the saved web page dialog box pop-up command and access time list 134, then the web page, pop-up commands, and access time for the pop-up commands are saved in the web page dialog box pop-up command and access time list 134 as indicated in a block 216. Then normal processing is performed at block 206.

If determined at decision block 214 that the identified pop-up commands are stored in the saved web page dialog box pop-up command and access time list 134, then it is determined whether the pop-up commands are older than a predetermined time limit as indicated in a decision block 218. When the pop-up commands are older than a predetermined time limit, then the access time is reset in the saved web page dialog box pop-up command and access time list 134 as indicated in a block 220. Then normal processing is performed at block 206. When the pop-up commands are not older than a predetermined time limit, then the pop-up commands are ignored and everything else is rendered as indicated in a block 222. Then normal processing is performed at block 206.

In brief summary, methods and the browser program for eliminating unnecessary dialog box pop-ups 132 of the preferred embodiment achieve advantages over conventional arrangements in that the user no longer needs to repeatedly close boxes that he has already seen and can save a significant amount of time when the user goes back and forth between web pages that have pop-up commands in them.

Figure 3:
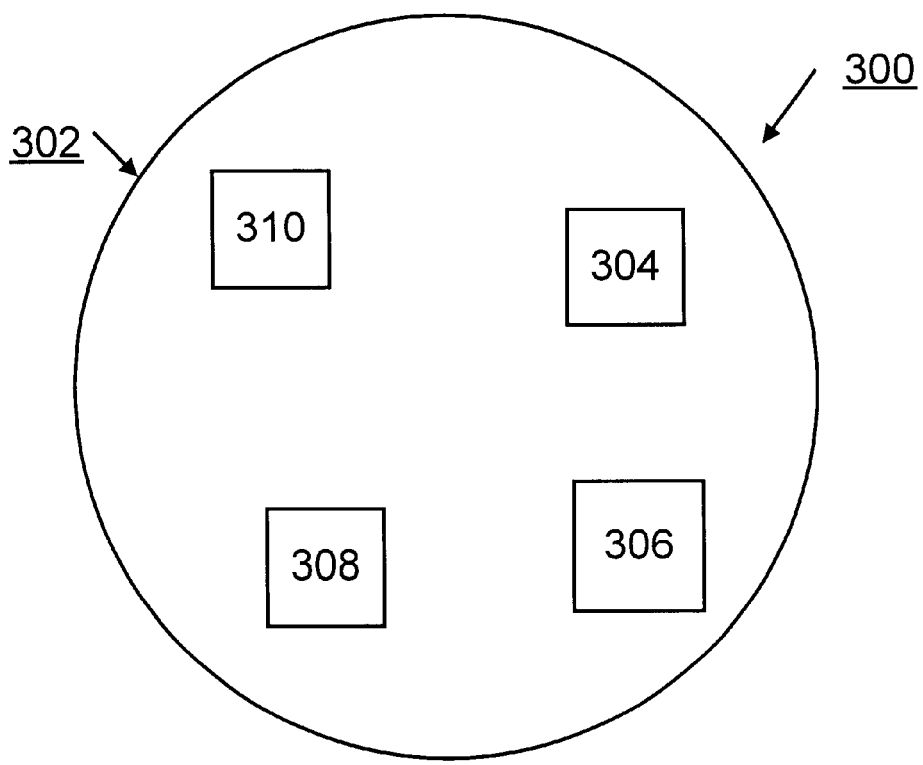
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for eliminating unnecessary dialog box pop-ups of the preferred embodiment in the system 100 of FIG. 1A.

A sequence of program instructions or a logical assembly of one or more interrelated modules defined by the recorded program means 304, 306, 308, 310, direct the computer system 100 for eliminating unnecessary dialog box pop-ups of the preferred embodiment.

While the present invention has been described with reference to the details of the embodiments of the invention shown in the drawing, these details are not intended to limit the scope of the invention as claimed in the appended claims.

What is claimed is:

1. A computer-implemented browser method for eliminating unnecessary dialog box pop-ups in a computer system comprising the steps of:

retrieving web page data;

checking for a pop-up command within said retrieved web page data;

responsive to identifying said pop-up command within said retrieved web page data, checking a saved web page data pop-up command list for said identified pop-up command; and responsive to identifying said pop-up command within said saved web page data pop-up command list, ignoring said pop-up command.

2. A computer-implemented browser method for eliminating unnecessary dialog box pop-ups as recited in claim 1 includes the step responsive to not identifying said pop-up command within said saved web page data pop-up command list, of saving said identified pop-up command within said saved web page data pop-up command list.

3. A computer-implemented browser method for eliminating unnecessary dialog box pop-ups as recited in claim 2 wherein the step of includes the step of saving said identified pop-up command within said saved web page data pop-up command list includes the step of saving an access time for said identified pop-up command.

4. A computer-implemented browser method for eliminating unnecessary dialog box pop-ups as recited in claim 1 includes the step responsive to identifying said pop-up command within said saved web page data pop-up command list, of checking whether said pop-up command is older than a predetermined time limit.

5. A computer-implemented browser method for eliminating unnecessary dialog box pop-ups as recited in claim 4 includes the step responsive to identifying said pop-up command as older than said predetermined time limit, of resetting an access time for said pop-up command within said saved web page data pop-up command list.

6. A computer-implemented browser method for eliminating unnecessary dialog box pop-ups as recited in claim 5 includes the step of normally processing said pop-up command.

7. A computer-implemented browser method for eliminating unnecessary dialog box pop-ups as recited in claim 1 includes the step responsive to not identifying said pop-up command within said retrieved web page data, of normally processing said retrieved web page data.

8. A browser computer program product for eliminating unnecessary dialog box pop-ups in a computer system comprising:

a recording medium;

means, recorded on the recording medium, for storing a web page data pop-up command list;

means, recorded on the recording medium, for retrieving web page data;

means, recorded on the recording medium, for checking for a pop-up command within said retrieved web page data;

means, recorded on the recording medium, responsive to identifying said pop-up command within said retrieved web page data, for checking a saved web page data pop-up command list for said identified pop-up command; and means, recorded on the recording medium, responsive to identifying said pop-up command within said saved web page data pop-up command list, for ignoring said pop-up command.

9. A browser computer program product for eliminating unnecessary dialog box pop-ups as recited in claim 8 includes means, recorded on the recording medium, responsive to identifying said pop-up command within said saved web page data pop-up command list, of checking whether said pop-up command is older than a predetermined time limit.

10. A browser computer program product for eliminating unnecessary dialog box pop-ups as recited in claim 9 includes means, recorded on the recording medium, responsive to identifying said pop-up command as older than said predetermined time limit, of resetting an access time for said pop-up command within said saved web page data pop-up command list.

11. A browser computer program product for eliminating unnecessary dialog box pop-ups as recited in claim 10 includes means, recorded on the recording medium, for normally processing said pop-up command.

12. A browser computer program product for eliminating unnecessary dialog box pop-ups as recited in claim 10 includes means, recorded on the recording medium, for saving an access time together with an identified pop-up command within said web page data pop-up command list.

13. A computer system comprising:

a processor, a memory coupled to the processor for storing a computer program product for eliminating unnecessary dialog box pop-ups for a user; said computer program product including a plurality of computer executable instructions stored on a computer readable medium, wherein said instructions, when executed by said computer, cause the computer to perform the steps of:

storing a web page data pop-up command list;

retrieving web page data;

checking for a pop-up command within said retrieved web page data;

responsive to identifying said pop-up command within said retrieved web page data, checking a saved web page data pop-up command list for said identified pop-up command; and responsive to identifying said pop-up command within said saved web page data pop-up command list, ignoring said pop-up command.

14. A computer system as recited in claim 13 wherein the step of storing a web page data pop-up command list includes the steps responsive to not identifying said pop-up command within said retrieved web page data, of saving said identified pop-up command together with an access time within said saved web page data pop-up command list.

15. A computer system as recited in claim 13 includes the step responsive to identifying said pop-up command within said saved web page data pop-up command list, of checking whether said pop-up command is older than a predetermined time limit.

16. A computer system as recited in claim 15 includes the step responsive to identifying said pop-up command as older than said predetermined time limit, of resetting an access time for said pop-up command within said saved web page data pop-up command list.

17. A computer system as recited in claim 16 includes the step responsive to identifying said pop-up command as older than said predetermined time limit, of normally processing said pop-up command.

* * * * *